United States Patent
Jiang et al.

(10) Patent No.: US 9,123,932 B2
(45) Date of Patent: Sep. 1, 2015

(54) NANOFIBER SUPPORTED CATALYSTS AS MEMBRANE ADDITIVES FOR IMPROVED FUEL CELL DURABILITY

(75) Inventors: Ruichun Jiang, Rochester, NY (US); Zhiqiang Yu, Rochester, NY (US); Junliang Zhang, Dayton, NJ (US)

(73) Assignee: GM Global Technology Operations LLC, Detroit, MI (US)

(*) Notice: Subject to any disclaimer, the term of this patent is extended or adjusted under 35 U.S.C. 154(b) by 227 days.

(21) Appl. No.: 13/298,339

(22) Filed: Nov. 17, 2011

(65) Prior Publication Data

US 2013/0130133 A1    May 23, 2013

(51) Int. Cl.
*H01M 8/06* (2006.01)
*H01M 8/10* (2006.01)
*H01M 8/02* (2006.01)

(52) U.S. Cl.
CPC .......... *H01M 8/1004* (2013.01); *H01M 8/0291* (2013.01); *H01M 8/1018* (2013.01); *H01M 8/1051* (2013.01); *H01M 8/1053* (2013.01); *H01M 8/1072* (2013.01); *H01M 2300/0094* (2013.01); *Y02E 60/521* (2013.01)

(58) Field of Classification Search
CPC ............ H01M 8/04; H01M 8/10; H01M 2/14
USPC ................................. 429/309, 409
See application file for complete search history.

(56) References Cited

U.S. PATENT DOCUMENTS 6,485,858 B1 * 11/2002 Baker et al. ............ 429/524
6,692,858 B2 * 2/2004 Higuchi et al. ........... 429/494
7,128,993 B2 * 10/2006 Barnwell et al. .......... 429/492
2004/0209965 A1 * 10/2004 Gascoyne et al. .......... 521/27
2009/0186251 A1 7/2009 Budinski
2011/0027696 A1 2/2011 Fay

FOREIGN PATENT DOCUMENTS

| CN | 1839509 A | 9/2006 |
|---|---|---|
| CN | 101079487 A | 11/2007 |
| DE | 112004000288 T5 | 9/2006 |

(Continued)

OTHER PUBLICATIONS

Jiang et al. Through-plane proton transport resistance of membrane and ohmic resistance distribution in fuel cells, Oct. 2009, J. Electrochem. Soc, 156, B1440-B1446.*

(Continued)

*Primary Examiner* — Ula C Ruddock
*Assistant Examiner* — Daniel Gatewood
(74) *Attorney, Agent, or Firm* — Dinsmore & Shohl LLP

(57) ABSTRACT

A fuel cell membrane and a method of making the same. The membrane includes at least one non-reinforced layer and at least one reinforced layer. Both layers include a proton-conductive ionomer, while the reinforced layer additionally includes nanofiber-supported catalyst that improve mechanical and chemical durability of the membrane. The nanofiber-supported catalyst is made up of structural fibers onto which an electrocatalyst is coated, deposited or otherwise formed. The structural nanofibers give increased strength and stiffness to the layers that include them, while the electrocatalyst helps to resist electrochemical degradation to the membranes that include them. Such a membrane may form the basis of a fuel cell's membrane electrode assembly.

9 Claims, 5 Drawing Sheets

(56) References Cited

FOREIGN PATENT DOCUMENTS

| | | |
|---|---|---|
| DE | 112007000670 T5 | 1/2009 |
| DE | 102009004529 A1 | 8/2009 |
| DE | 102010031903 A1 | 3/2011 |
| WO | 2004073090 A2 | 8/2004 |
| WO | 2007107832 A1 | 9/2007 |

OTHER PUBLICATIONS

Jiang et al, Through-Plane Proton Transport Resistance of Membrane and OHmic Resistance Distribution in Fuel Cells, Oct. 13, 2009, J. Electrochem. Soc., 156, B1440-1446.*

* cited by examiner

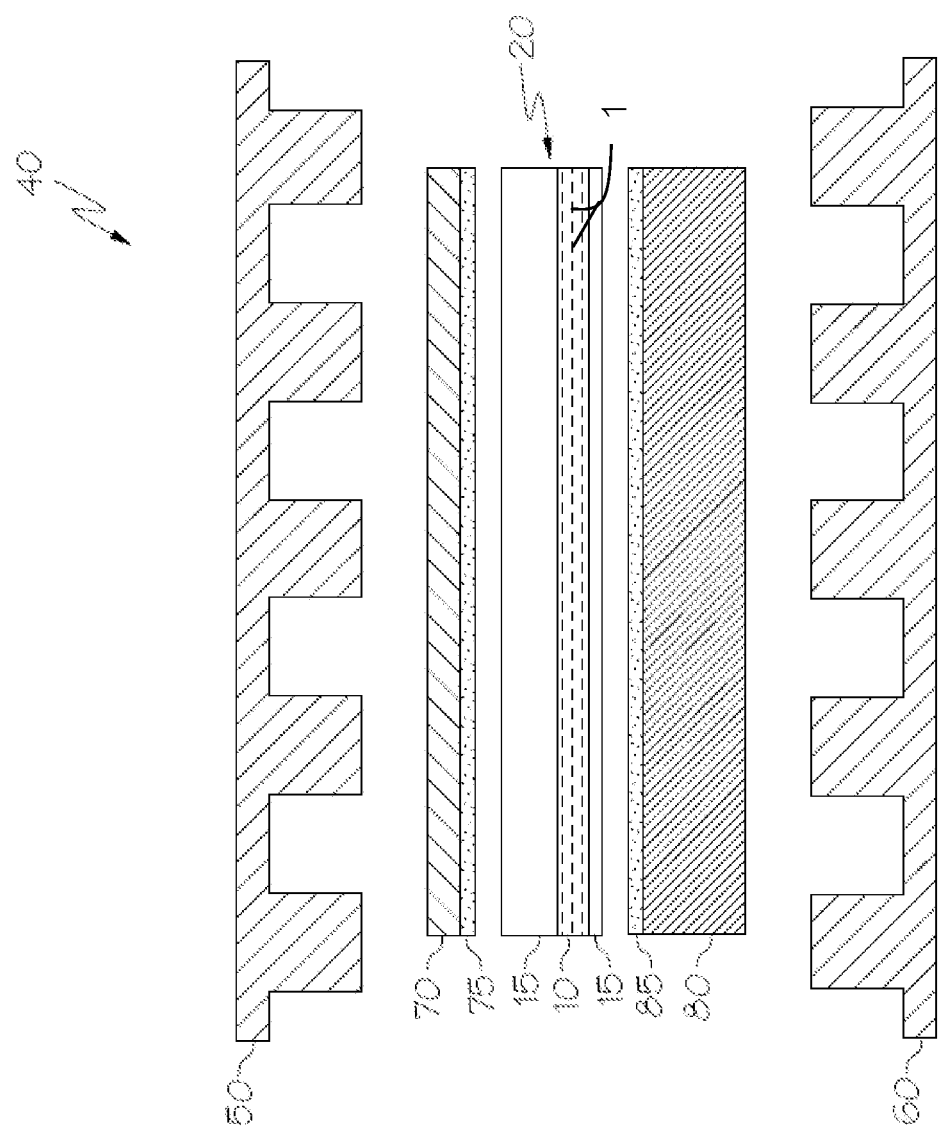

NANOFIBER SUPPORTED CATALYSTS AS MEMBRANE ADDITIVES FOR IMPROVED FUEL CELL DURABILITY

The invention relates generally to fuel cells, and more particularly to a polymer electrolyte membrane (PEM) having improved durability.

BACKGROUND OF THE INVENTION

Fuel cells, also referred to as electrochemical conversion cells, produce electrical energy by processing reactants, for example, through the oxidation and reduction of hydrogen and oxygen. Hydrogen is a very attractive fuel because it is clean and it can be used to produce electricity efficiently in a fuel cell. The automotive industry has expended significant resources in the development of hydrogen fuel cells as a source of power for vehicles. Vehicles powered by hydrogen fuel cells would be more efficient and generate fewer emissions than today's vehicles employing internal combustion engines.

In a typical fuel cell system, hydrogen or a hydrogen-rich gas is supplied as a reactant through a flowpath to the anode side of a fuel cell while oxygen (such as in the form of atmospheric oxygen) is supplied as a reactant through a separate flowpath to the cathode side of the fuel cell. Catalysts, typically in the form of a noble metal such as platinum (Pt) or palladium (Pd), are placed at the anode and cathode to facilitate the electrochemical conversion of the reactants into electrons and positively charged ions (for the hydrogen) and negatively charged ions (for the oxygen). In one well-known fuel cell form, the anode and cathode may be made from a layer of electrically-conductive gaseous diffusion media (GDM) material onto which the catalysts are deposited to form a catalyst coated diffusion media (CCDM). An electrolyte layer separates the anode from the cathode to allow the selective passage of ions to pass from the anode to the cathode while simultaneously prohibiting the reactant gases from crossing over to the other side of the fuel cell. The electrons generated by the catalytic reaction at the anode, which are also prohibited from flowing through the electrolyte layer, are instead forced to flow through an external electrically-conductive circuit (such as a load) to perform useful work before recombining with the charged ions at the cathode. The combination of the positively and negatively charged ions at the cathode results in the production of non-polluting water as a byproduct of the reaction. In another well-known fuel cell form, the anode and cathode may be formed directly on the electrolyte layer to form a layered structure known as a catalyst coated membrane (CCM). A membrane electrode assembly (MEA) may include, in one form, a CCM surrounded on opposing sides by respective anode and cathode GDMs, while in another form, a membrane made up of the electrolyte layer surrounded on opposing sides by respective anode and cathode CCDMs.

One type of fuel cell, called the proton exchange membrane (PEM) fuel cell, has shown particular promise for vehicular and related mobile applications. The electrolyte layer (also known as an ionomer layer) of a PEM fuel cell is in the form of a solid proton-transmissive electrolyte membrane (such as a perfluorosulfonic acid membrane, a commercial example of which is Nafion®). Regardless of whether either of the above CCM-based approach or CCDM-based approach is employed, the presence of an anode separated from a cathode by an electrolyte layer forms a single PEM fuel cell; many such single cells can be combined to form a fuel cell stack, increasing the power output thereof. Multiple stacks can be coupled together to further increase power output.

Durability is one of the factors that determine the commercialization of a fuel cell. For example, the desired life for a vehicle fuel cell is more than 5,000 hours. The high durability requirement is a challenge to the materials and structure development of the PEM for fuel cell applications. One or both of mechanical or chemical sources often contribute to the failure of the PEM in a fuel cell. Several strategies have been used to alleviate PEM mechanical degradation, including incorporating a reinforced layer (for example, an ionomer filled expanded polytetrafluoroethylene (ePTFE) matrix), introducing nanofiber (NF) materials into a PEM, and applying reinforced layers to reinforce the PEM externally. Known strategies to improve the chemical durability of a PEM include introducing precious metals (for example, the same Pt or Pd that can be used because of their strong catalytic activity for chemical reactions) into the PEM, and incorporating radical scavenger chemicals (for example, cerium (Ce) or manganese (Mn) through ion exchange or additives of salt and oxide format).

SUMMARY OF THE INVENTION

A new strategy for improving the durability of a fuel cell involves incorporating nanofiber-supported catalysts in the PEM. The new membrane fabrication technique involves forming a multilayer membrane structure that includes reinforced and non-reinforced layers, where at least some of the support of the former is through the use of nanofibers that also include catalysts (for example, Pt or Pd) deposited thereon, while the latter uses the proton-conductive ionomer to form the non-reinforced layers of the membrane. As will be discussed in more detail below, the resulting layered approach demonstrated improved mechanical and chemical durability in fuel cell tests.

According to a first aspect of the invention, a fuel cell membrane includes one or more non-reinforced layers and one or more reinforced layers. The non-reinforced layer or layers are made up of at least a proton-conductive ionomer, while the reinforced layer or layers additionally include nanofibers dispersed in, on or throughout the ionomer as a way to increase mechanical properties at least within the in-plane directions formed by the layer. Furthermore, the nanofibers have a catalyst formed on them to improve chemical or electrochemical performance and durability of the respective layer or layers. By having the reinforced and non-reinforced layers stacking or otherwise placed onto one another, the membrane takes on multilayer (i.e., sandwich-like) attributes, even in configurations where subsequent processing may tend to cause adjacent layers to blend with one another as a way to blur the distinction between such adjacent layers.

In one optional form, the catalyst is deposited on the nanofiber. The nanofiber material used may be a polymer, carbon, metal, ceramic oxide or composite. In other options, the outer surface of the membrane may be either the non-reinforced layer or the reinforced layer, depending on the need. In one preferred form, the reinforced layer has between about 1 weight percent and about 50 weight percent of nanofiber-supported catalyst.

According to another aspect of the invention, a fuel cell includes an anode flowpath, a cathode flowpath, a membrane disposed between the anode flowpath and the cathode flowpath, and anode and cathode diffusion layers, where (as with the previous aspect) each of the layers of the membrane is proton-conductive and when combined define a structure with one or more non-reinforced layers and one or more reinforced layers. The anode and cathode flowpaths (which may be in the form of channel-forming bipolar plates or the like) are used configured to deliver respective reactants from a fuel source and an oxygen source. The anode diffusion media and cathode diffusion medias (as examples of the aforementioned GDMs) are arranged to be in electrical communication with respective anode and cathode sides of the membrane, and may function as a conduit for both electric current and the passage of the reactants from the flowpaths to the electrode catalyst layers underneath, this latter function made possible by their porous construction. The cooperation of the membrane and the diffusion layers is equally applicable to configurations where the catalytic reaction of the first and second reactants takes place either within a portion of the diffusion layers (in which case the construction of the GDMs tend to mimic that of the aforementioned CCDMs) or on the surface of the membrane (in which case the construction of the membranes tend to mimic that of the aforementioned CCMs where a PEM includes catalysts disposed on opposing surfaces to define respective anode and cathode sides).

Optionally, the one or more reinforced layers that make up the multilayer membrane have between about 1 and 50 weight percent of nanofiber-supported catalyst. In another option, the nanofibers of the nanofiber-supported catalyst of the at least one reinforced layer are oriented substantially randomly within the at least one reinforced layer. In other words, each of the layers are thin enough relative to the lengths of the nanofibers that the nanofibers tend to orient predominantly within the plane of each thin layer, rather than extend along the through-the-thickness dimension of the layer. As such, the reinforcement made possible by the nanofibers tends to be along one of the two axes formed within the plane formed by the respective layer, while no substantial increase in strength is evidenced in the layer's out-of-plane dimension.

According to yet another aspect of the invention, a method of making a reinforced fuel cell membrane includes depositing at least a first layer and a second layer onto each other, and curing the deposited layers, where one of the first and second layers is substantially non-reinforced, while the other of the first and second layers is reinforced. Within the present context, a layer may be reinforced mechanically, as well as chemically (or electrochemically). Mechanical reinforcement occurs when the layer includes structural elements (such as discontinuous reinforcing fibers) as a way to improve strength, stiffness, damage tolerance or related indicia. Likewise, chemical or electrochemical reinforcement occurs when the layer includes elements (such as noble metal catalysts or the like) supported on the nanofibers as a way to improve ability of the layer to withstand increases in open circuit voltage (OCV) that occur as the result of electrochemical and chemical activity in or around the layer.

As such, there are three overarching activities related to preparation of a fuel cell with a reinforced membrane. In a first, a nanofiber-supported catalyst is produced. From this, a multilayer membrane is prepared, where the layers with the nanofiber-reinforced catalyst are stacked in conjunction with layers without any fiber reinforcement. From this, the MEA is prepared. In one optional form to prepare nanofiber supported catalyst, the nanofiber material and the catalyst precursor can be mixed in the solvent and sonicated. The pH of the mixture of the nanofiber material and the catalyst precursor in the solvent may be adjusted by using an appropriate acidic or basic solution. In a particular form, Pt is deposited on the nanofibers from its precursor in a separate container. After such deposition is made, a solution may be prepared with ionomer, the Pt-deposited nanofibers and solvent for making the reinforced layer of membrane. In one form, a ratio of nanofiber-supported catalyst to ionomer is in a range from about 1:20 to about 1:2 by weight. In another optional form, at least one of the layers can be deposited on a backer film. Various ways of curing the deposited first and second layers may be used, such as heat treating, drying or combinations of the two. Either or both of the first and second layers may be made from a mixture of ionomer and solvent, where the reinforced layer additionally includes having the nanofiber-supported catalyst. In a particular form, each deposited layer is dried before depositing the next layer. For example, each deposited layer may be dried at room temperature for approximately one half an hour prior to deposition of the next layer. Once the membrane has been formed, it can be included as part of a larger fuel cell construction, such as an MEA. In such case, catalytic layers can be placed in electrochemical communication with opposing outer surfaces of the membrane. Such a construction allows for electrical continuity between the MEA and a subsequently-affixed GDM.

BRIEF DESCRIPTION OF THE DRAWINGS

The following detailed description of the preferred embodiments of the present invention can be best understood when read in conjunction with the following drawings, where like structure is indicated with like reference numerals and in which:

FIG. 5 shows an exploded view of a notional fuel cell according to an embodiment of the present invention.

DETAILED DESCRIPTION OF THE PREFERRED EMBODIMENTS

This invention relates to developing nanofiber-supported catalysts and applying them as additives to create a reinforced layer that in turn can be used in conjunction with non-reinforced layers that together make up multilayer fuel cell membranes. By applying thin (for example, less than 1-2 μm) coatings via multiple passes, the nanofiber additives in the reinforced layers may be substantially maintained in the in-plane direction to optimize the strengthening effect in the deposited plane. The nanofiber materials may be organic (e.g., polymer (such as polyvinylidene fluoride (PVDF) or polyether sulfone (PES)) or inorganic (e.g., carbon, metal, ceramic oxide and composites (e.g., $CeO_2$, $MnO_2$, $TiO_2$, $ZrO_2$, or $CeZrO_4$)). The nanofiber materials can be electrically conductive (e.g., carbon, or metal) or non-conductive (e.g., ceramic oxide and composites). As shown below, an MEA made with such a multilayer membrane having reinforced and non-reinforced layers demonstrates improved chemical and mechanical durability in fuel cell tests.

Figure 1:
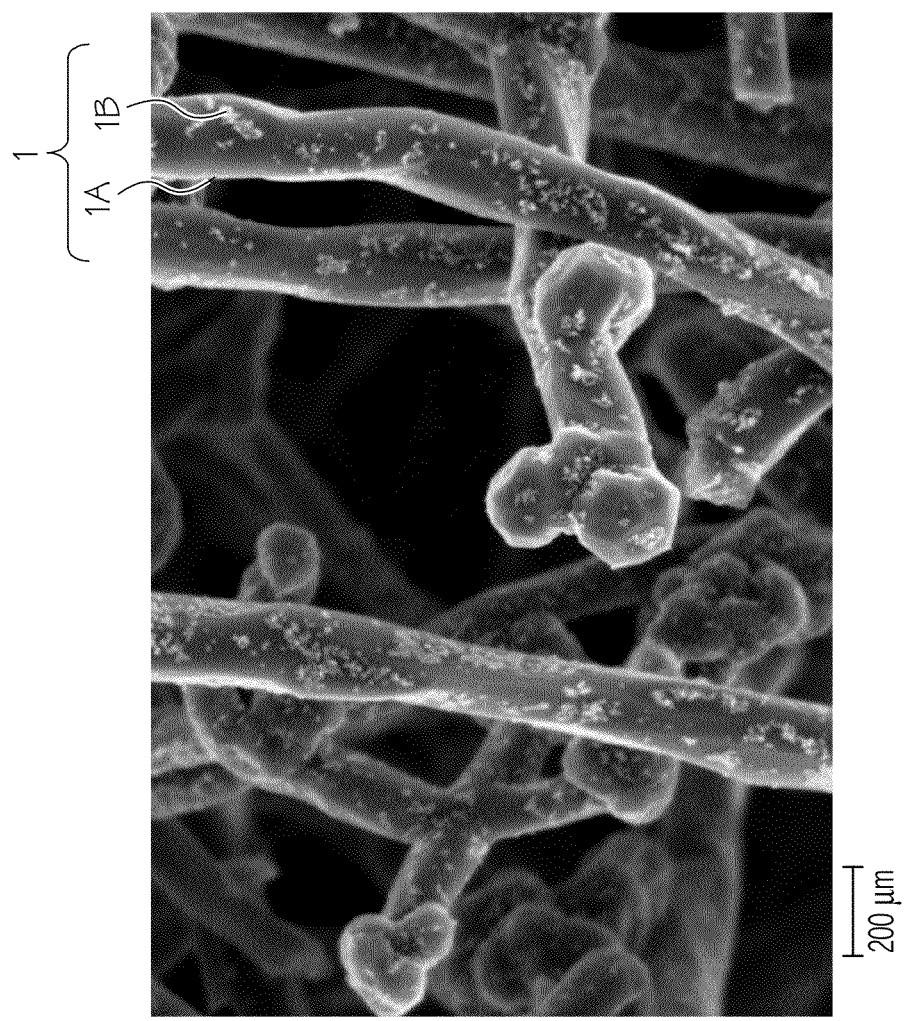
FIG. 1 shows a scanning electron microscopy (SEM) image of carbon nanofiber-supported Pt catalyst.
Figure 2:
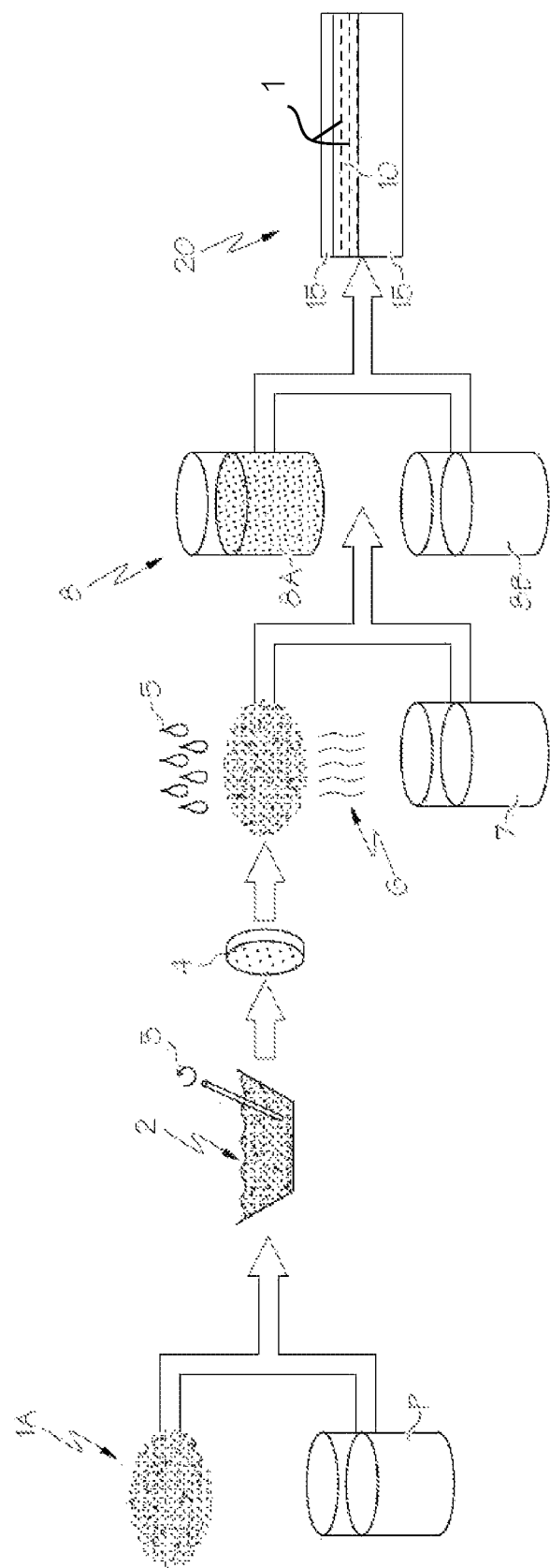
FIG. 2 shows the steps used to make a multilayer membrane of a single reinforced layer disposed between a pair of non-reinforced layers.

Referring first to FIGS. 1 and 2, one example of the nanofiber-supported catalyst 1 includes a carbon nanofiber 1A that provides support for a Pt particle catalyst 1B. The inventors prepared a nanofiber-supported catalyst 1B with 10% Pt supported on carbon nanofiber 1A. A 1 g quantity of carbon (which was pre-treated in 5M $HNO_3$ acid at 80° C. for 24 hours) nanofibers and 0.3 g chloroplatinic acid hydrate ($H_2PtCl_6 \cdot 6H_2O$) was mixed in 600 to 1200 ml ethylene glycol for the above 10 wt % target. The mixed solution was sonicated for 1 hour for full dispersion and dissolution, after which its pH value was adjusted from 9 to 11 using 1M sodium hydroxide (NaOH) in ethylene glycol. The solution was stirred at room temperature under $N_2$ flow for 24 hours, and subsequently heated up to 130° C., followed by holding at the final temperature for approximate 10 hours. The resulting Pt-coated nanofiber was filtered, washed with deionized water, and dried in an oven at 80° C. for 24 hours. The resulting nanofiber-supported catalyst 1 was examined by scanning electron microscopy (SEM), as shown. The size of carbon nanofiber 1A was about 150 nm in diameter, and the Pt particles 1B distributed on the nanofibers 1A had particle size of less than 10 nm.

Referring with particularity to FIG. 2, a procedure for constructing a notional three-layer 20 membrane configuration with alternating layers 10, 15 of reinforced and non-reinforced material is shown. It will be apparent from the remainder of the disclosure that configurations with only two layers (not shown, specifically, a single layer of reinforced material 10 and a single layer of non-reinforced material 15), as well as those with larger numbers (not shown) of both reinforced and non-reinforced layers 10, 15 are also within the scope of the present invention. In the first part of the procedure, randomly-oriented nanofibers 1A and a noble metal catalyst precursor P (for example, chloroplatinic acid hydrate ($H_2PtCl_6 \cdot 6H_2O$) or potassium hexachloroplatinate ($K_2PtCl_6$)) are mixed in a solvent such as ethylene glycol or alcohol to make up ink precursor dispersion 2. In one form, the mixing is achieved by stirring 3 or by any other suitable method. For example, the ink precursor dispersion 2 may be sonicated (e.g., for about 1 hour) to achieve full dispersion and dissolution. The pH value of the ink precursor dispersion 2 can be adjusted to a desired value by adding acidic (e.g., $HNO_4$, $H_2SO_4$) or basic (e.g., NaOH) ingredients as needed. After sonication, the ink precursor dispersion 2 is stirred (e.g., for about 24 hours) at temperature (e.g., room temperature) and gas purge (e.g., $N_2$) conditions. The reaction under this second stirring may be performed at other desired conditions (e.g., at higher temperature (e.g., 70-180° C.)) as needed. The chemical reduction reaction results in the formation of a nanofiber-supported catalyst 1 that is filtered 4, washed 5 with deionized water, and dried or heat treated 6 (for example, at about 80° C., in air, for about 24 hours), although it will be appreciated by those skilled in the art that the drying/heat treating conditions are not critical, and that any suitable conditions may be used.

In the second part of the procedure, two different coating solutions 8 include the coating solution 8A containing the nanofiber-supported catalyst 1 from the previous part of the procedure, as well as the coating solution 8B that is devoid of the reinforcement. Both solutions 8A and 8B include an ionomer (not separately shown); in one form, the ionomer is Nafion®-based, although other equivalents may also be used. It will be appreciated by those skilled in the art that the precise makeup of the coating solutions 8A, 8B (as well as the aforementioned ink precursor dispersion 2) may be tailored to specific requirements; for example, types and amounts of solvents, as well as the use of organic or inorganic additives. The concentration of nanofiber-supported catalysts 1 and ionomer, as well as the weight ratio between them can be adjusted by adding different amounts of solvent or other liquid. In this example, the resulting ink solution 8A has a ratio of nanofiber-supported catalyst 1 to ionomer in the range from about 1:20 to about 1:2 by weight, to get about 5 to about 35 wt % of nanofiber-supported catalyst 1 in the dry reinforced layers. Diluted Nafion® solution 8B without additive reinforcements were also prepared with 5-20 wt % concentration.

In the third part of the procedure, membranes 20 can be made by coating alternating layers of the unreinforced ionomer solution 8B and the nanofiber-supported catalyst-reinforced ionomer solution 8A onto a backer film that in turn can be deposited layer-by-layer, or by a single step procedure with the coating height adjusted for each layer. In either scenario, the resulting membrane 20 takes on multilayer attributes, as the non-homogeneity of the alternating reinforced and non-reinforced layers tends to be preserved, even in situations where subsequent membrane processing (involving one or more of heat and compression, for example) would have a tendency to blend or otherwise at least partially homogenize the stacked layers 10, 15. In one exemplary form, the present inventors used a 50 μm polytetrafluoroethylene (PTFE) backer film from Saint-Gobain as the backer film. An Erichsen coater with 10 inches by 15 inches of active membrane coating area was used. The thickness of each layer 10, 15 of the membranes 20 can be controlled by one or both of the amount of respective solution 8A, 8B applied, as well as the concentration of the same. A Bird applicator (such as available from Paul E. Gardner Co.) with selected slot thickness (in the range of 25-150 μm) was used to coat each specific membrane layer 10, 15. The thickness of each membrane layer 10, 15 was controlled by the height of the Bird applicator slot, which determined the amount of respective solution 8A, 8B applied, as well as the concentration of the coating solution 8A, 8B. For the layer-by-layer procedure, multiple coating passes (also known as ramps) were conducted for the reinforced layer 10 to ensure the in-plane direction of the nanofiber-supported catalyst 1, and that the thickness of each pass was less than 2 μm after drying. As shown in FIG. 2, the reinforced membrane layer 10 includes a plurality of nanofiber-supported catalyst 1 oriented substantially within the horizontal plane of the reinforced membrane layer 10. So long as the orientation of the fibers was substantially within the plane of the deposited layer (rather than oriented in a through-the-thickness direction), neither coating layer deposition nor the distribution within the plane fiber orientation was taken into consideration for the built-up reinforcing layers. Once each of the layers 10, 15 are deposited, the membranes are then dried (typically at about room temperature for at least a half an hour after each layer or pass of coating); afterward, once all of the layers 10, 15 or the whole membrane 20 are coated, they are heat treated (typically between 250° F. to 300° F. for 1 to 24 hours). In one particular form, the heat treatment was conducted at 140° C. for 12 hours. For comparative purposes, single layer membranes (not shown) were also prepared without nanofiber additives. The thickness of all of the membranes in this example were controlled to the same value (about 20 μm), although as shown in FIG. 2, at least one of the layers 15 may be made to have a different thickness, depending on the need.

Referring next to FIG. 5, a fuel cell 40 with anode bipolar plate 50, cathode bipolar plate 60, anode CCDM 70 and cathode CCDM 80 is shown. Membrane 20 (such as that prepared from the steps of FIG. 2 described above) is shown disposed between adjacent CCDMs 70, 80 in general, and between the catalytically-active electrode layers 75 (anode electrode layer), 85 (cathode electrode layer) that form part of the respective CCDMs 70, 80 in particular. Although shown presently in a CCDM-based configuration (where the creation of the work-producing external electric current extends between catalytic layers of the CCDMs), it will be appreciated by those skilled in the art that the present invention is equally applicable to a CCM-based configuration (where the creation of the work-producing external electric current extends between catalytic layers formed on the outer opposing surfaces of the membrane). The arrangement may optionally include a subgasket (for example, an 8 μm layer of Kapton, not shown) positioned between it and the CCDMs 70, 80 on one or both sides. The subgasket has the shape of a frame, and the size of the window is smaller than the footprint of the membrane 20 and the CCDMs 70, 80. Pt/Vulcan was used to form the electrocatalyst layer. As will be understood by those skilled in the art, Pt/Vulcan or Pt/V is a type of catalyst used in fuel cells. When preparing electrode layers, Pt/V may be mixed with ionomer in a solvent to form catalyst/ionomer inks, after which the inks may be coated on GDM with controlled loadings to form CCDMs. In the present invention, the inventors used a Pt loading (weight of a normal metal (for example, Pt) per unit area of MEA) of 0.4 mg/cm$^2$ at the cathode and 0.05 mg/cm$^2$ at the anode. In one form, the reinforced layer 10 of membrane 20 may be biased toward the cathode CCDM 80; such construction compensates for the faster travel of the crossover hydrogen by having them traverse a longer path than the crossover oxygen. Chemical catalytic reaction of hydrogen and oxygen from crossover takes place at a Pt active surface inside of the membrane thereby reducing reactant gas crossover. As shown in FIG. 5, the reinforced membrane layer 10 includes a plurality of nanofiber-supported catalyst 1 oriented substantially within the horizontal plane of the reinforced membrane layer 10.

MEAs made up of membranes 20 with CCDMs 70, 80 were tested for mechanical and chemical durability. MEAs made from membranes without reinforcement were also prepared. In one form, the mechanical durability testing was based on RH cycling. In the RH cycling tests, the portion conducted without loads was used to evaluate the mechanical durability of MEAs containing membranes with and without reinforced layers. For each test, 50 cm$^2$ active area graphite plates with 2 mm width straight channels and lands were used for the cell build. The RH cycling test was conducted at 80° C., and ambient outlet gas pressure, while 2 SLPM constant flow rate of air was introduced in both the anode and cathode of the cell in a counter-flow format. The air supplies to the anode and cathode were periodically by-passed or passed through humidifiers controlled at 90° C., to achieve 150% RH and 0% RH with a duration of 2 min at each condition. The MEA failure criteria was arbitrarily defined as 10 sccm crossover gas leak between from anode to cathode or vice versa. The target of the RH cycling test for a MEA is at least 20,000 RH cycles with less than 10 sccm crossover gas leak.

Figure 3:
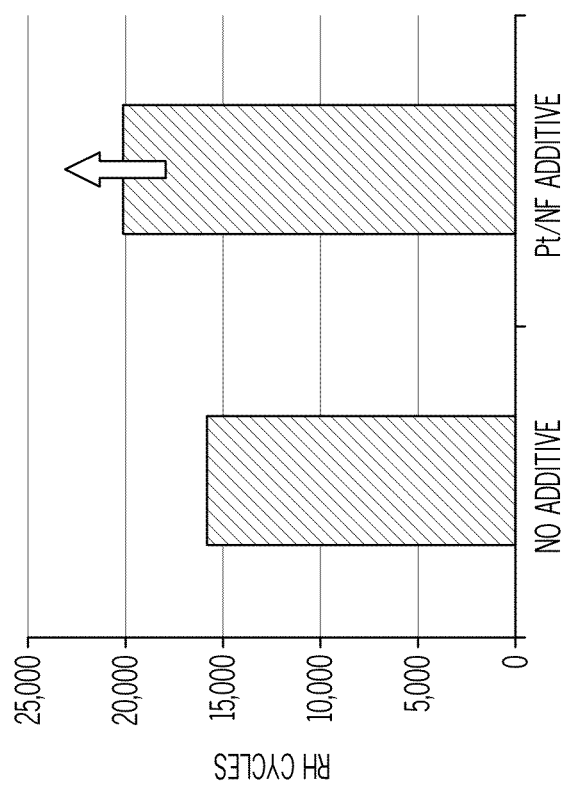
FIG. 3 shows the duration cycles in RH cycling tests of membranes with and without nanofiber-supported catalyst additives.

The results of RH cycling tests are shown in FIG. 3, where the MEAs containing the membrane without the reinforced layer failed with significant leakage at fewer than 20,000 cycles, whereas the MEAs containing the multilayer membranes 20 with reinforced layer passed the test criteria. As such, the present inventors have inferred that the reinforced layers containing nanofiber-supported Pt catalyst additives improved fuel cell durability by enhancing membrane mechanical stability.

Figure 4:
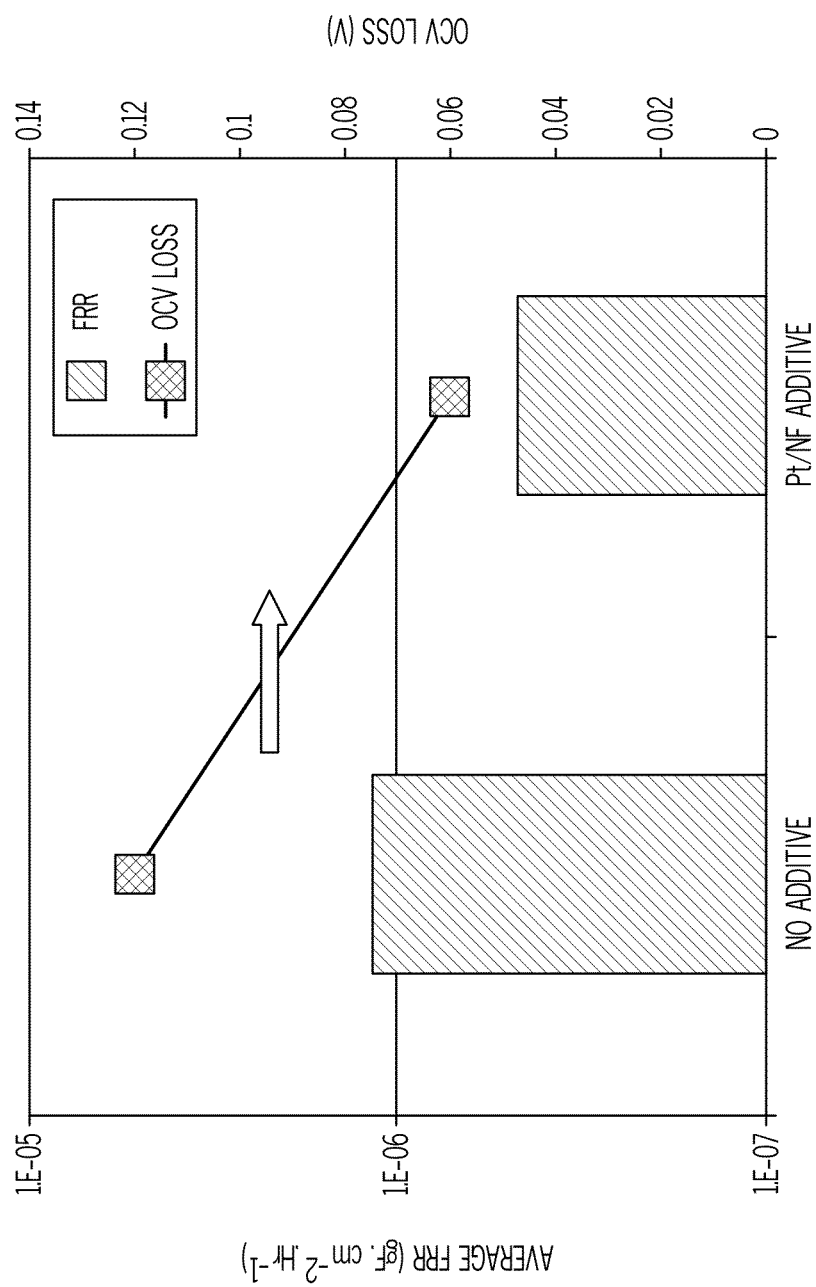
FIG. 4 shows the average fluoride release rates (FRRs) during OCV tests, and OCV losses of membranes with and without nanofiber-supported catalyst additives in the membranes.

The MEAs were also subjected to chemical durability tests under open circuit voltage (OCV) conditions. Some of the MEAs were configured as having multilayer membrane containing nanofiber-supported Pt catalysts in the reinforced layer, while others were configured as comparison membrane samples without a reinforced layer; each were individually assembled in fuel cell hardware and tested for chemical durability under various OCV conditions, including a standard test procedure at 95° C., and 50% RH for 100 hours duration, and then at 95° C., 25% RH for another 100 hours duration. Under these conditions, the MEAs were subject to chemical degradation due to the production of oxidants including hydroxyl radical (•OH) and $H_2O_2$. During this test, the fuel cell OCV, as well as the fluoride release rate (FRR), were evaluated and recorded. As shown in FIG. 4, the MEA containing nanofiber-supported Pt catalysts in the reinforced layer of the membrane demonstrated better durability than the membrane without the reinforced layer: it has smaller OCV loss and lower averaged FRR throughout the test duration. In the MEA with the reinforced layer, the Pt reduced crossover of reactant gases (e.g., $H_2$, $O_2$) and by-product (e.g., $H_2O_2$), therefore, provided protection to the membrane for improved membrane durability.

It is noted that terms like "generally," "commonly," and "typically," when utilized herein, are not utilized to limit the scope of the claimed embodiments or to imply that certain features are critical, essential, or even important to the structure or function of the claimed embodiments. Rather, these terms are merely intended to identify particular aspects of an embodiment or to emphasize alternative or additional features that may or may not be utilized in a particular embodiment. Further, it is noted that recitations herein of a component of an embodiment being "configured" in a particular way or to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural factors of the component. For the purposes of describing and defining embodiments herein it is noted that the terms "substantially," "significantly," and "approximately" are utilized to represent the inherent degree of uncertainty that may be attributed to any quantitative comparison, value, measurement, or other representation, and as such may represent the degree by which a quantitative representation may vary from a stated reference without resulting in a change in the basic function of the subject matter at issue.

Having described embodiments of the present invention in detail, and by reference to specific embodiments thereof, it will be apparent that modifications and variations are possible without departing from the scope of the embodiments defined in the appended claims. More specifically, although some aspects of embodiments of the present invention are identified herein as preferred or particularly advantageous, it is contemplated that the embodiments of the present invention are not necessarily limited to these preferred aspects.

The invention claimed is:

1. A fuel cell membrane defining a proton-transmissive electrolyte therein, the electrolyte comprising:
   at least one non-reinforced layer comprising ionomer substantially free of nanofiber-supported catalyst; and
   at least one reinforced layer comprising ionomer and nanofiber-supported catalyst,
   wherein said nanofiber-supported catalyst comprises nanofibers that are directionally oriented substantially within a horizontal plane of the reinforced layer.

2. The reinforced membrane of claim 1 wherein the nanofiber-supported catalyst comprises catalyst deposited on the nanofibers.

3. The reinforced membrane of claim 2 wherein the nanofibers comprises polymers, carbon, metals, ceramic oxides or composites.

4. The reinforced membrane of claim 1 wherein a surface layer comprises the non-reinforced layer.

5. The reinforced membrane of claim 1 wherein a surface layer comprises the reinforced layer.

6. The reinforced membrane of claim 1 wherein the reinforced layer has about 1 to about 50 wt% of nanofiber-supported catalyst.

7. A fuel cell comprising:
- an anode flowpath configured to deliver a first reactant from a fuel source;
- a cathode flowpath configured to deliver a second reactant from an oxygen source;
- a membrane defining a proton-transmissive electrolyte therein disposed between the anode flowpath and the cathode flowpath, the membrane comprising:
  - at least one non-reinforced layer comprising a proton-conductive ionomer substantially free of nanofiber-supported catalyst; and
  - at least one reinforced layer comprising a proton-conductive ionomer and nanofiber-supported catalyst wherein said nanofiber-supported catalyst comprises nanofibers that are directionally oriented substantially within a horizontal plane of the reinforced layer;
- an anode diffusion layer in electrical communication with an anode side of the membrane such that electrons liberated by a catalytic reaction of the first reactant in at least one of the anode diffusion layer and the proton-conductive membrane may flow through the anode diffusion layer;
- a cathode diffusion layer in electrical communication with a cathode side of the membrane such that at least a portion of the liberated electrons may combine with an ionized form of the first and second reactants to form a substantially inert byproduct.

8. The fuel cell of claim 7, wherein the at least one reinforced layer has about 1 to about 50 wt% of nanofiber-supported catalyst.

9. The fuel cell of claim 7, wherein the nanofibers of the nanofiber-supported catalyst of the at least one reinforced layer are oriented substantially randomly within the at least one reinforced layer.

* * * * *